United States Patent
Wu

(10) Patent No.: US 6,643,937 B1
(45) Date of Patent: Nov. 11, 2003

(54) GARDENING SHEARS

(75) Inventor: Shih-Piao Wu, Chang Hua Hsien (TW)

(73) Assignee: Jiin Haur Industrial Co., Ltd., Chang Hua Hsien (TW)

( * ) Notice: Subject to any disclaimer, the term of this patent is extended or adjusted under 35 U.S.C. 154(b) by 51 days.

(21) Appl. No.: 10/087,047

(22) Filed: Mar. 4, 2002

(51) Int. Cl.$^7$ .......................... B26B 13/06; B26B 13/20
(52) U.S. Cl. .............................. 30/262; 30/261; 30/341
(58) Field of Search ........................ 30/254, 256, 257, 30/259, 261, 262, 341, 231, 197, 250, 188, 191

(56) References Cited

U.S. PATENT DOCUMENTS

| | | | | |
|---|---|---|---|---|
| 4,114,268 A | * | 9/1978 | Hildebrandt et al. | 30/262 |
| 4,156,311 A | * | 5/1979 | Wallace et al. | 30/262 |
| 4,341,016 A | * | 7/1982 | Harrison et al. | 30/262 |
| 6,418,626 B1 | * | 7/2002 | Jang | 30/262 |
| 2003/0070300 A1 | * | 4/2003 | Huang | 30/262 |

* cited by examiner

Primary Examiner—Douglas D. Watts
(74) Attorney, Agent, or Firm—Harrison & Egbert

(57) ABSTRACT

A pair of gardening shears includes a fixed handle, a fixed jaw, a movable handle, a movable jaw, and a pivoting member for pivoting the fixed jaw and the movable jaw together. The pivoting member is formed of a bolt, a nut, and a collar for preventing sideward motion of the bolt and for preventing the fixed jaw from turning along with the bolt. The fixed jaw is provided with a recessed portion for reducing the area of mechanical friction between the fixed jaw and the movable jaw. The nut is provided with a serrated portion which is engaged with a serrated portion of a pivoting plate of the movable handle. The fixed handle is provided with a rubber piece serving as a cushion to absorb shock noise when the movable handle is moved toward the fixed handle.

1 Claim, 6 Drawing Sheets

GARDENING SHEARS

RELATED U.S. APPLICATIONS

Not applicable.

STATEMENT REGARDING FEDERALLY SPONSORED

RESEARCH OR DEVELOPMENT

Not applicable.

REFERENCE TO MICROFICHE APPENDIX

Not applicable.

FIELD OF THE INVENTION

The present invention relates generally to a gardening implement, and more particularly to a pair of gardening shears.

BACKGROUND OF THE INVENTION

Conventional gardening shears are generally short in service life span and are ineffective in cutting the garden plant twigs. As a result, both amateur and professional gardeners are easily frustrated by such a predicament.

BRIEF SUMMARY OF THE INVENTION

The primary objective of the present invention is to provide a durable pair of gardening shears free of the deficiency of the conventional gardening shears described above.

The features and the advantages of the present invention will be readily understood upon a thoughtful deliberation of the following detailed description of the present invention with reference to the accompanying drawings.

DETAILED DESCRIPTION OF THE INVENTION

Figure 1:
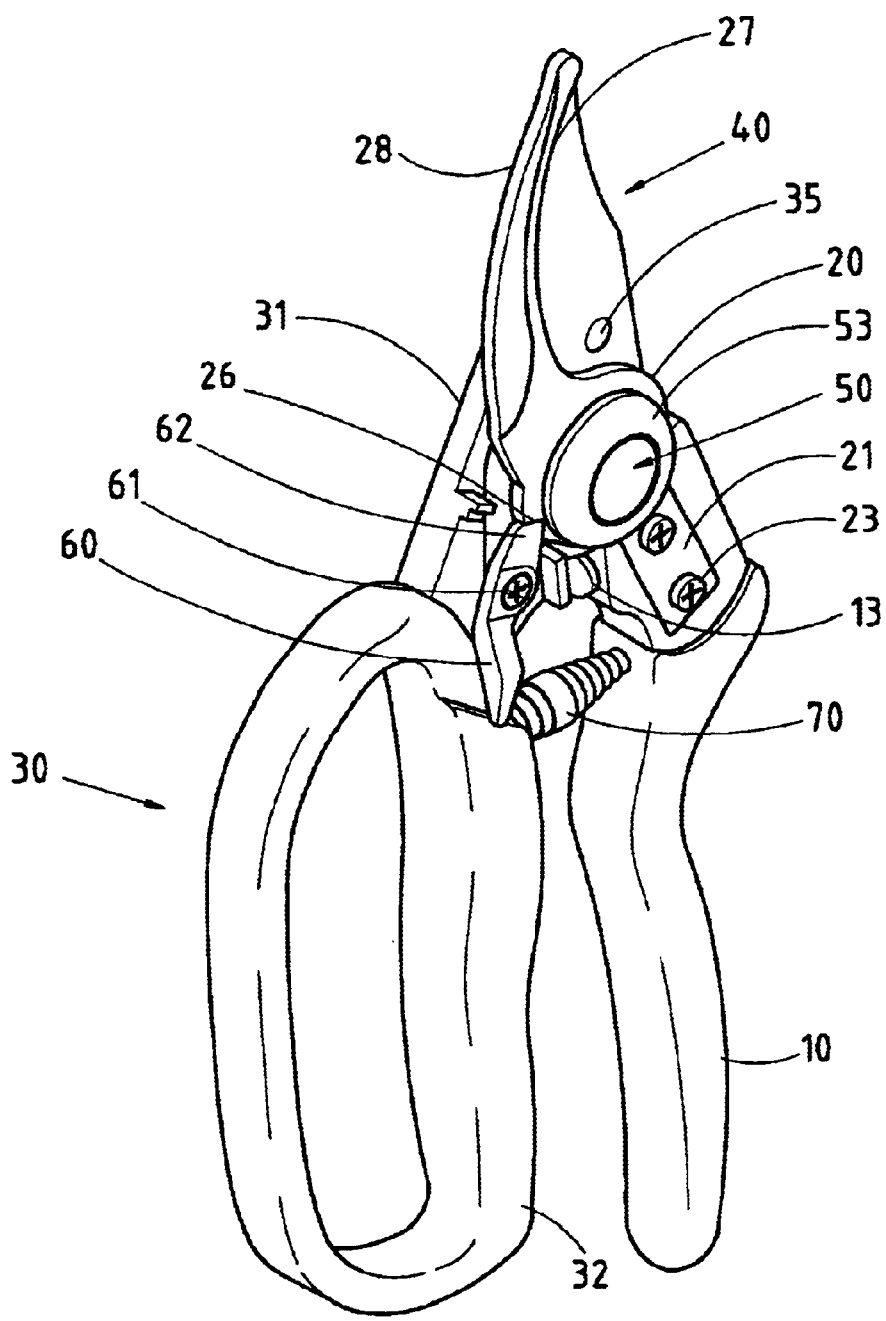
FIG. 1 shows a perspective view of the present invention.
Figure 2:
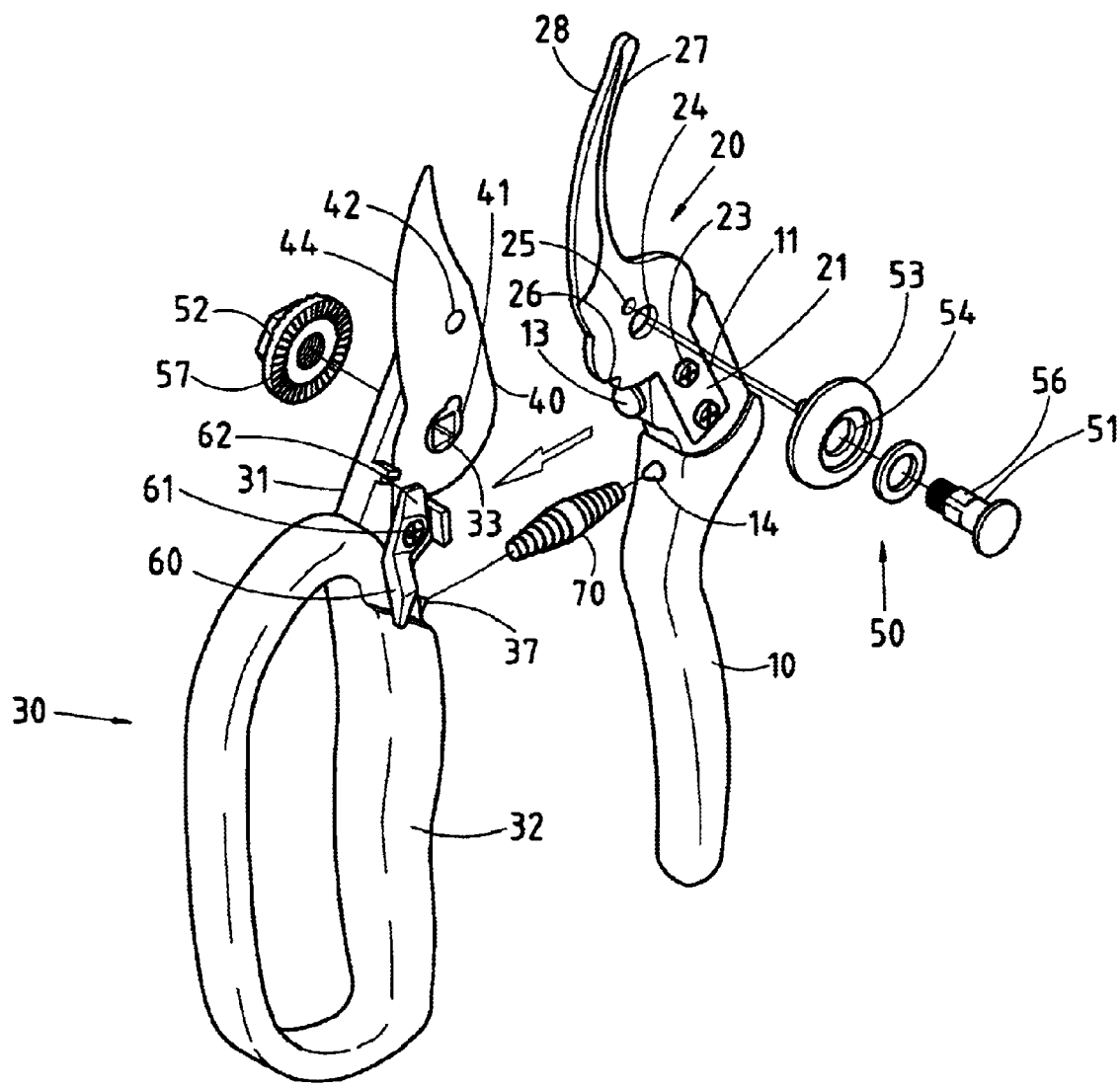
FIG. 2 shows an exploded view of the present invention.
Figure 3:
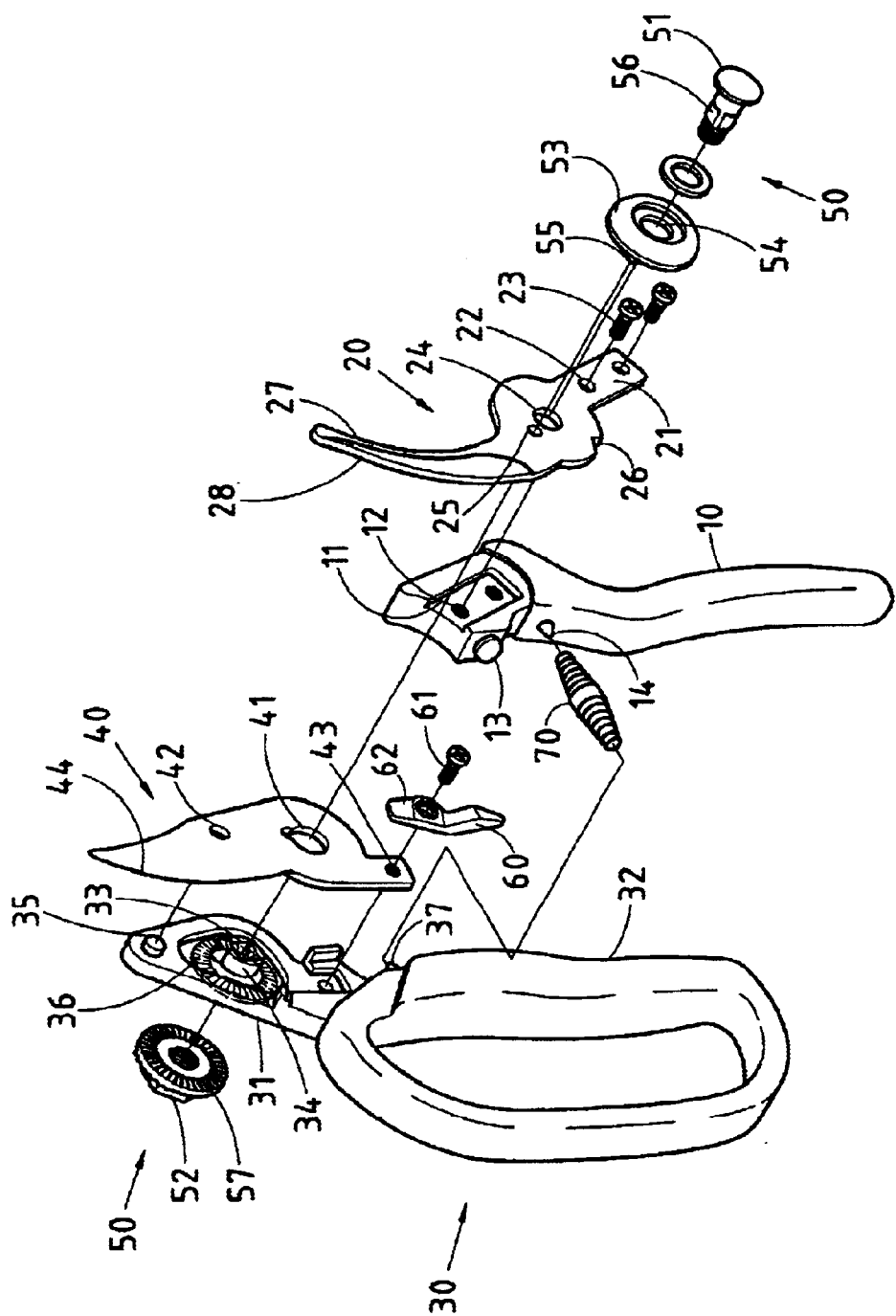
FIG. 3 shows another exploded view of the present invention.
Figure 4:
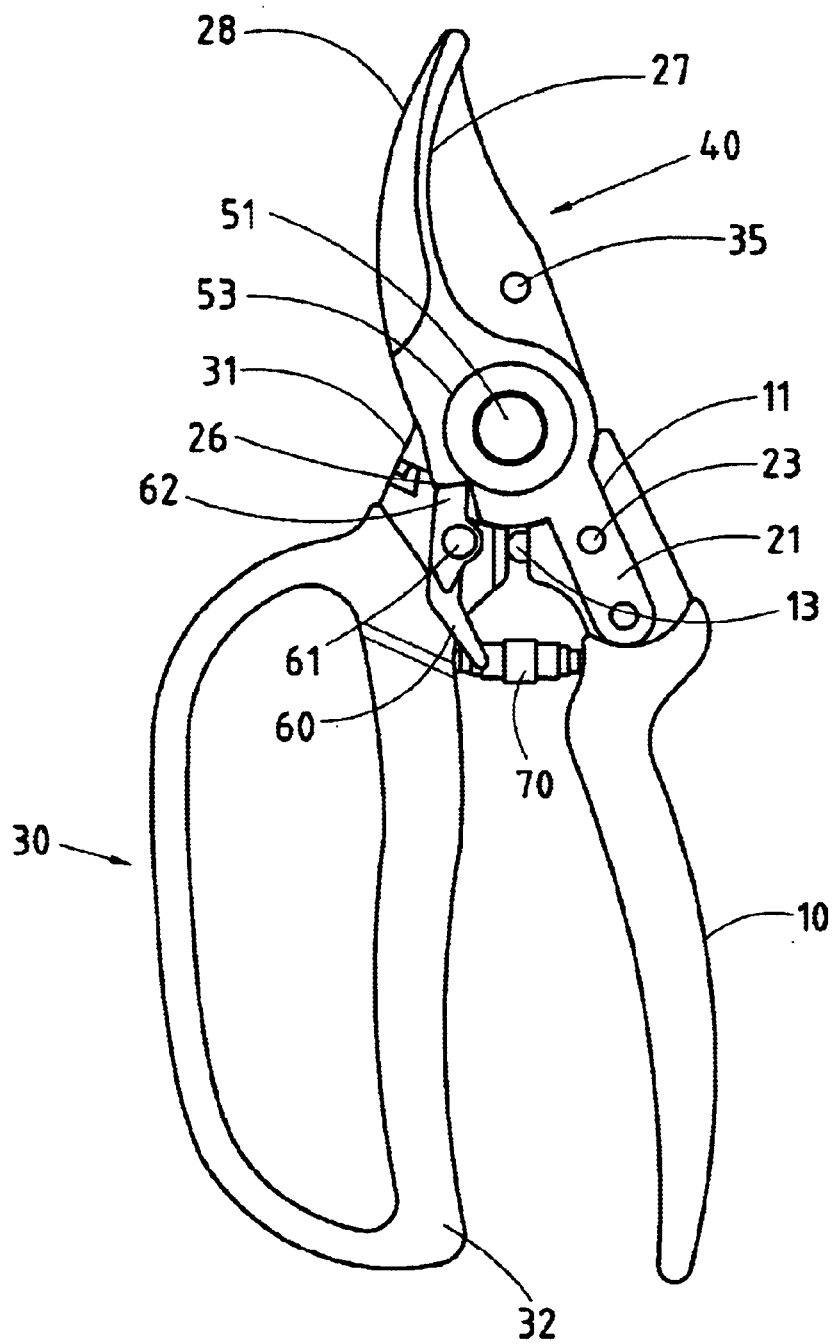
FIG. 4 shows a schematic view of the present invention in combination.
Figure 5:
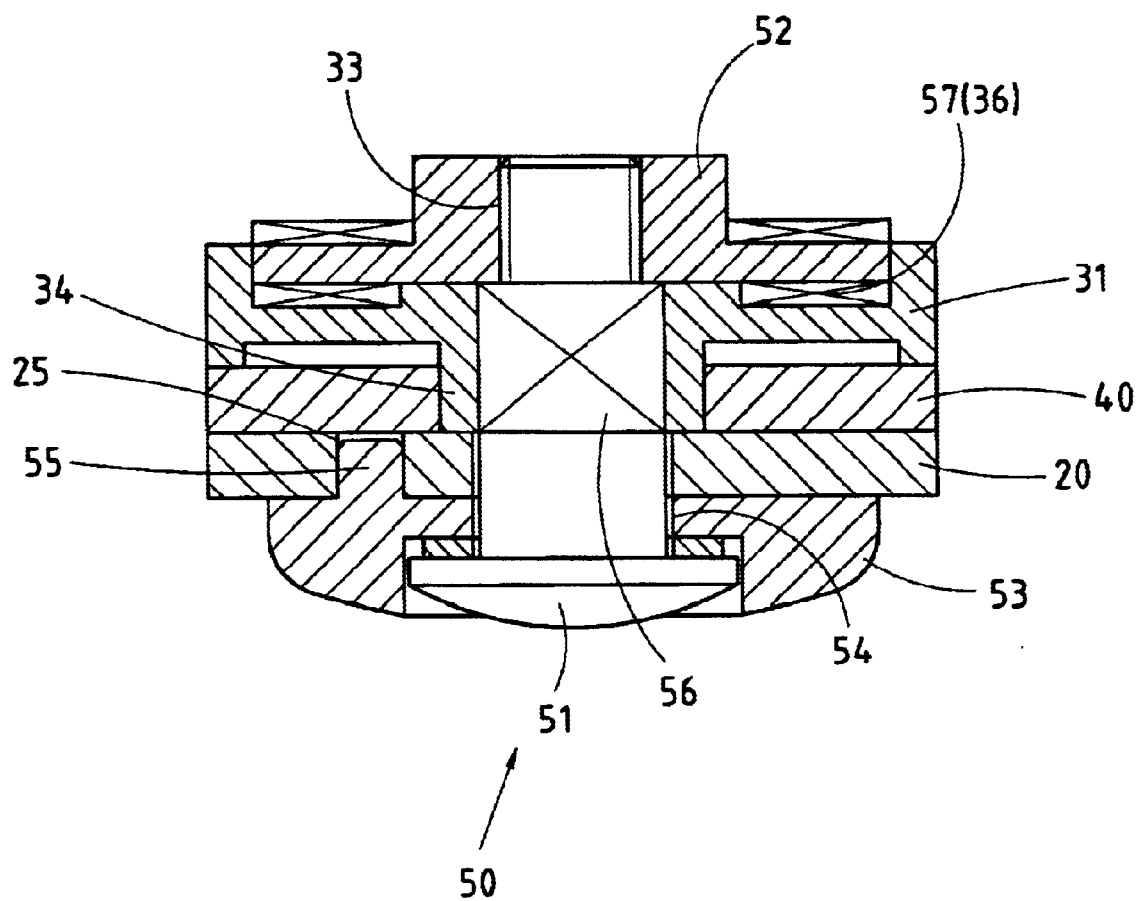
FIG. 5 shows a partial sectional view of the present invention.
Figure 6:
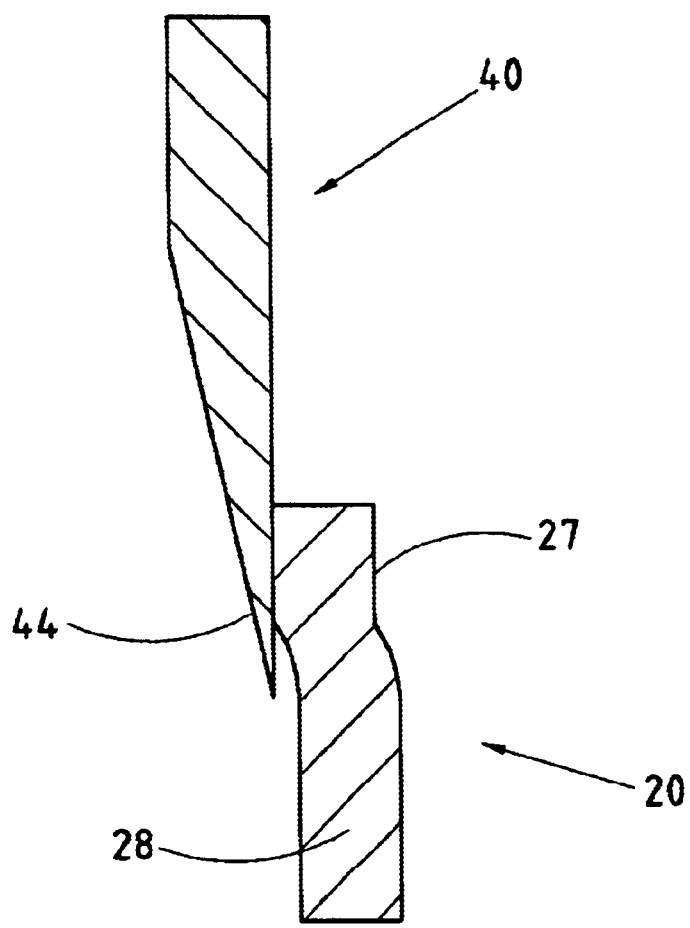
FIG. 6 shows a sectional view of the engagement of the movable jaw with the fixed jaw of the present invention.

As shown in FIGS. 1–6, a pair of gardening shears of the present invention comprises a fixed handle 10, a fixed jaw 20, a movable handle 30, a movable jaw 40, a pivoting member 50, a locating knob 60, and a recovery spring 70.

The fixed handle 10 is provided at one end with a slot 11, a threaded hole 12 located in the bottom wall of the slot 11, a rubber piece 13, and a projection 14.

The fixed jaw 20 has a fastening end 21 which is provided with a threaded hole 22 and is fastened with one end of the fixed handle 10 by a fastening bolt 23 which is engaged with the threaded holes 12 and 22. The fastening end 21 is received in the slot 11 of the fixed handle 10. The fixed jaw 20 is provided in the midsegment with a pivoting hole 24, a locating hole 25, and a retaining edge 26. The fixed jaw 20 is provided at an engaging end with a curved fixed blade 27 and a recessed portion 28.

The movable handle 30 is provided with a pivoting plate 31 and a hand grip 32 opposite in location to the pivoting plate 31. The pivoting plate 31 is provided in one side with a pivoting pillar 34, and a retaining protrusion 35. The pivoting pillar 34 has a through hole 33 corresponding in location to the pivoting hole 24 of the fixed jaw 20. The pivoting plate 31 is further provided in other side with a serrated portion 36. The hand grip 32 is provided with a projection 37 corresponding in location to the projection 14 of the fixed handle 10. The through hole 33 has a square cross section.

The movable jaw 40 is provided with a retaining hole 42 corresponding in location to the retaining protrusion 35 of the pivoting plate 31, a pivoting hole 41 corresponding in location to the pivoting hole 24 of the fixed jaw 20 and the pivoting pillar 34 of the pivoting plate 31, a threaded hole 43, and an arcuate blade portion 44.

The pivoting member 50 is formed of a bolt 51, a nut 52, and a plastic collar 53. The plastic collar 53 is provided with a center through hole 54 and an eccentric pillar 55 corresponding in location to the locating hole 25 of the fixed jaw 20. The bolt 51 is provided in the midsegment of the shank thereof with a rod section 56. The nut 52 is provided with a serrated portion 57 opposite in location to the serrated portion 36 of the pivoting plate 31.

The locating knob 60 is rotatably fastened with the movable jaw 40 by a fastening bolt 61 which is engaged with the threaded hole 43 of the movable jaw 40. The locating knob 60 can be turned clockwise such that a locating end 62 of the locating knob 60 is rested against the retaining edge 26 of the fixed jaw 20. The recovery spring 70 is retained at one end by the projection 14 of the fixed handle 10, and at the other end by the projection 37 of the movable handle 30. The fixed jaw 20 and the movable jaw 40 are pivoted together by the pivoting member 50. The bolt 51 is engaged with the nut 52 via the pivoting hole 24 of the fixed jaw 20, the pivoting hole 41 of the movable jaw 40, and the through hole 33 of the pivoting pillar 34 of the pivoting plate 31 of the movable handle 30. Located between the bolt 51 and the fixed jaw 20 is the plastic collar 53. The bolt 51 is put through the center through hole 54 of the collar 53. The eccentric pillar 55 of the collar 53 is retained in the locating hole 25 of the fixed jaw 20, thereby preventing the fixed jaw 20 from turning along with the bolt 51. The plastic collar 53 serves to prevent sideward motion of the bolt 51. The nut 52 is securely held to the pivoting plate 31, thanks to its serrated portion 57 which is engaged with the serrated portion 36 of the pivoting plate 31. The fixed jaw 20 is provided with the recessed portion 28 which serves to reduce the area of mechanical friction between the fixed jaw 20 and the movable jaw 30, thereby preventing the fixed jaw 20 and the movable jaw 30 from being jammed by the plant twigs. As the movable handle 30 moves toward the fixed handle 10, the rubber piece 13 of the fixed handle 10 serves as a cushion to absorb shock or noise.

I claim:

1. A pair of gardening shears comprising:
   a fixed handle;
   a fixed jaw fastened to one end of said fixed handle and comprised of a pivoting hole;
   a movable handle comprised of a pivoting plate, said pivoting plate being provided in one side with a pivoting pillar which has a through hole;

a movable jaw fastened to the one side of said pivoting plate and comprised of a pivoting hole;

a pivoting member comprised of a bolt and a nut for pivoting said fixed jaw and said movable jaw together such that said bolt is engaged with said nut via said pivoting hole of said fixed jaw, said pivoting hole of said movable jaw, and said through hole of said pivoting pillar of said pivoting plate of said movable handle;

a locating knob rotatably fastened to said movable jaw for locating said fixed jaw; and a recovery spring retained between said fixed jaw and said movable handle;

wherein said fixed jaw is comprised of a recessed portion to reduce the area of mechanical friction between said fixed jaw and said movable jaw, thereby preventing said fixed jaw and said movable jaw from being jammed by the garden plant twigs, said fixed jaw further comprised of a locating hole;

wherein said pivoting member is further comprised of a plastic collar whereby said plastic collar is comprised of a center through hole and an eccentric pillar and is disposed between said fixed jaw and said bolt such that said bolt is put through said center through hole of said plastic collar, and such that said eccentric pillar of said plastic collar is retained in said locating hole of said fixed jaw, thereby preventing said fixed jaw from turning along with said bolt, said plastic collar also serving to prevent sideward motion of said bolt;

wherein said nut of said pivoting member is provided in one side with a serrated portion, said pivoting plate of said movable handle is provided in another side with a serrated portion whereby said nut is securely engaged with said bolt such that said serrated portion of said nut is engaged with said serrated portion of said pivoting plate;

wherein said fixed handle is provided at one end with a rubber piece fastened thereto whereby said rubber piece serves as a cushion to absorb shock or noise at such time when said movable handle is moved toward said fixed handle.

\* \* \* \* \*